(12) United States Patent
Drachenberg et al.

(10) Patent No.: US 10,897,116 B2
(45) Date of Patent: Jan. 19, 2021

(54) METHOD AND APPARATUS FOR ENSURING A UNIFORM TEMPERATURE PROFILE IN RIBBON FIBER LASERS AND AMPLIFIERS

(71) Applicant: Lawrence Livermore National Security, LLC, Livermore, CA (US)

(72) Inventors: Derrek R. Drachenberg, Livermore, CA (US); Jay W. Dawson, Livermore, CA (US); Michael J. Messerly, Danville, CA (US); Paul H. Pax, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/854,468

(22) Filed: Dec. 26, 2017

(65) Prior Publication Data
US 2019/0199050 A1    Jun. 27, 2019

(51) Int. Cl.
| H01S 3/067 | (2006.01) |
| H01S 3/042 | (2006.01) |
| H01S 3/16 | (2006.01) |
| H01S 3/04 | (2006.01) |

(52) U.S. Cl.
CPC ............ *H01S 3/042* (2013.01); *H01S 3/0672* (2013.01); *H01S 3/06729* (2013.01); *H01S 3/1603* (2013.01); *H01S 3/0405* (2013.01); *H01S 3/06704* (2013.01); *H01S 3/06741* (2013.01); *H01S 3/06754* (2013.01); *H01S 3/1618* (2013.01)

(58) Field of Classification Search
CPC ...... H01S 3/042; H01S 3/1603; H01S 3/0672; H01S 3/06729
See application file for complete search history.

(56) References Cited

U.S. PATENT DOCUMENTS

| 8,675,275 B2 | 3/2014 | Boivin et al. |
| 9,162,917 B2 | 10/2015 | Burov et al. |
| 2002/0024727 A1* | 2/2002 | Wilcox ................... H01S 3/067 359/342 |
| 2003/0031442 A1* | 2/2003 | Siegman ............... G02B 6/0285 385/124 |
| 2009/0041061 A1* | 2/2009 | Shkunov ............. H01S 3/06704 372/6 |
| 2010/0189137 A1* | 7/2010 | Shkunov ................... H01S 3/04 372/6 |
| 2010/0189401 A1* | 7/2010 | Shkunov ............. H01S 3/06708 385/129 |
| 2012/0148206 A1 | 6/2012 | Boivin et al. |
| 2012/0275475 A1 | 11/2012 | Shkunov et al. |

(Continued)

OTHER PUBLICATIONS

Beach, et al., "Phase-locked antiguided multiple-core ribbon fiber," IEEE Photon. Technol. Lett. 15, 670-672 (2003).

(Continued)

*Primary Examiner* — Yuanda Zhang
(74) *Attorney, Agent, or Firm* — John P. Wooldridge (57) ABSTRACT

A uniform temperature profile is provided across the width of the core of a ribbon fiber laser or amplifier by the use of insulating elements at the core edges and a spatially variable gain in the fiber core. High average power ribbon fibers, enable a variety of applications such as practical laser cutting and beam combining.

30 Claims, 8 Drawing Sheets

(56) References Cited

U.S. PATENT DOCUMENTS

2014/0205300 A1\* 7/2014 Hemenway, Jr. .. H04B 10/2581
  398/116
2015/0340835 A1  11/2015 Sridharan et al.
2017/0229834 A1\*  8/2017 Pax ................... G02B 6/02338
2017/0302047 A1\* 10/2017 Jauregui Misas ... H01S 3/06716

OTHER PUBLICATIONS

Beach, et al., "Scalable antiguided ribbon laser," JOSA B 19, 1521-1534 (2002).
Dawson, et al., "Analysis of the scalability of diffraction-limited fiber lasers and amplifiers to high average power," Opt. Express 16, 13240-13266 (2008).
Drachenberg, et al., "First multi-watt ribbon fiber oscillator in a high order mode," Opt. Express 21, 18089-18096 (2013).
Drachenberg, et al., "First selective mode excitation and amplification in a ribbon core optical fiber," Opt. Express 21, 11257-11269 (2013).
Khitrov, et al., "Er-doped high aspect ratio core (HARC) rectangular fiber producing 5-mJ, 13-nsec pulses at 1572 nm," in Advanced Solid-State Photonics (2012), p. AW4A.5.
International Search Report and Written Opinion for PCT/US2018/0067365 corresponding to U.S. Appl. No. 15/854,468, 8 pages.

\* cited by examiner

FIG. 3A
Temperature profile for 10 kW amplifier

METHOD AND APPARATUS FOR ENSURING A UNIFORM TEMPERATURE PROFILE IN RIBBON FIBER LASERS AND AMPLIFIERS

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to ribbon fibers and amplifiers, and more specifically, it relates to techniques for controlling the temperature profile in such devices.

Description of Related Art

High average power fiber lasers and amplifiers are used in laser cutting and welding systems as well as in defense systems. Conventional fiber lasers which have circular cores are expected to be limited in output power due to a competition between thermal lensing and Stimulated Raman (or Brillouin) Scattering. Ribbon fiber lasers avoid these effects by strongly mitigating thermal lensing and allowing the core area to increase to the limits set by manufacturability. Unlike traditional circular core fibers, a ribbon fiber has a high aspect ratio stretched core which allows the heat generated during lasing to be removed primarily in one dimension only, from the long faces of the core. However, a practical ribbon fiber is not infinitely wide and because some of the heat is removed at the narrow edges of the fiber core, the thermal profile can have a gradient of a few degrees when the laser is running at high power. This small temperature transition is enough to cause mode mixing and ultimately laser failure. To enable high average power ribbon fibers, a method is desirable that ensures a uniform temperature profile across the entire core, provides a spatially variable gain in the fiber core and works for a range of power levels.

Figure 1A:
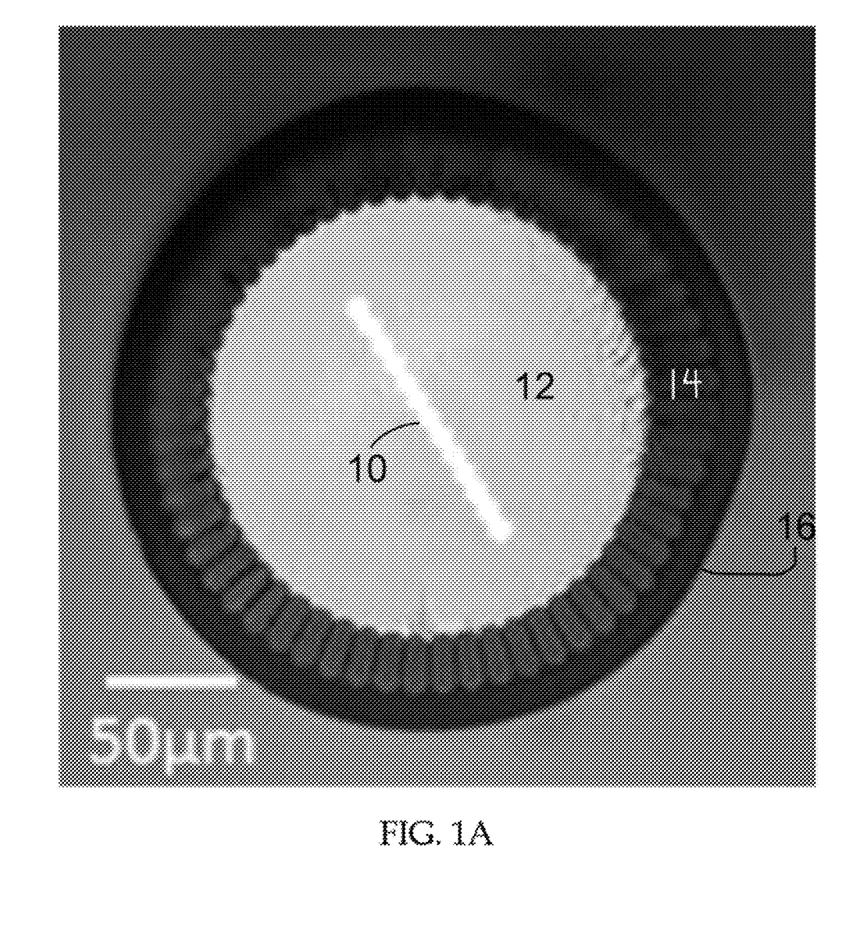
FIG. 1A shows the cross section of a ribbon fiber with an Yb-doped core and an air cladding.
Figure 1B:
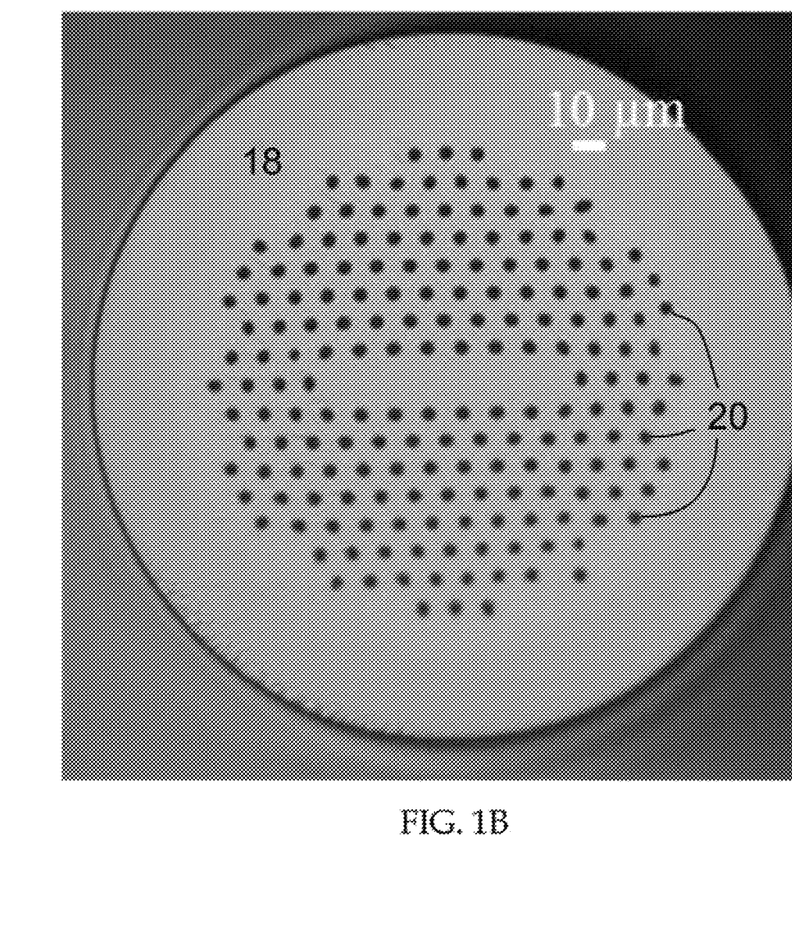
FIG. 1B shows the cross section of a ribbon fiber with a pure silica core guided by air holes.
Figure 2:
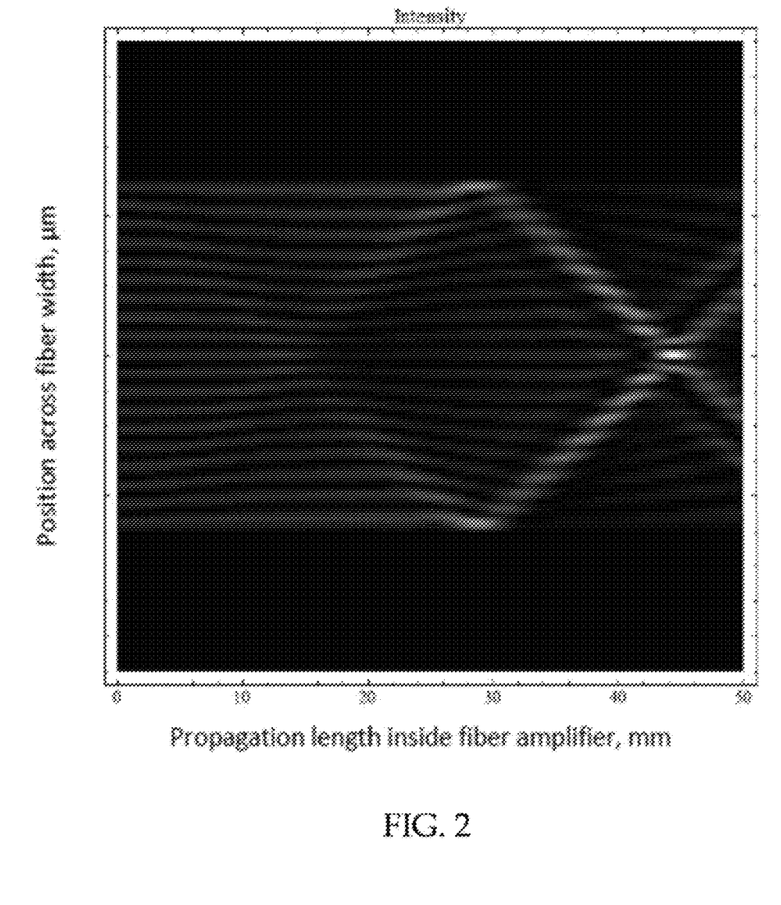
FIG. 2 shows the calculated high order mode propagation in a high-power ribbon fiber amplifier where a multi-lobed mode starts at the left part in the fiber and is distorted due to a thermal gradient as it propagates toward the right in the fiber.
Figure 3A:
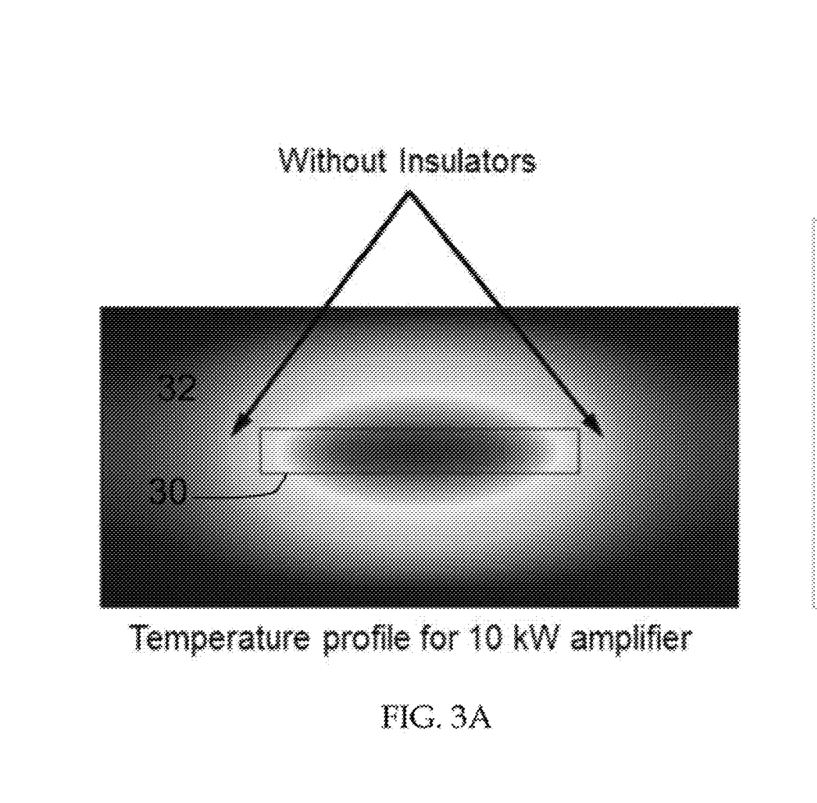
FIG. 3A is a cross-sectional thermal profile of a 10 kW ribbon fiber amplifier without insulators and without a spatially variable gain in the fiber core.
Figure 3B:
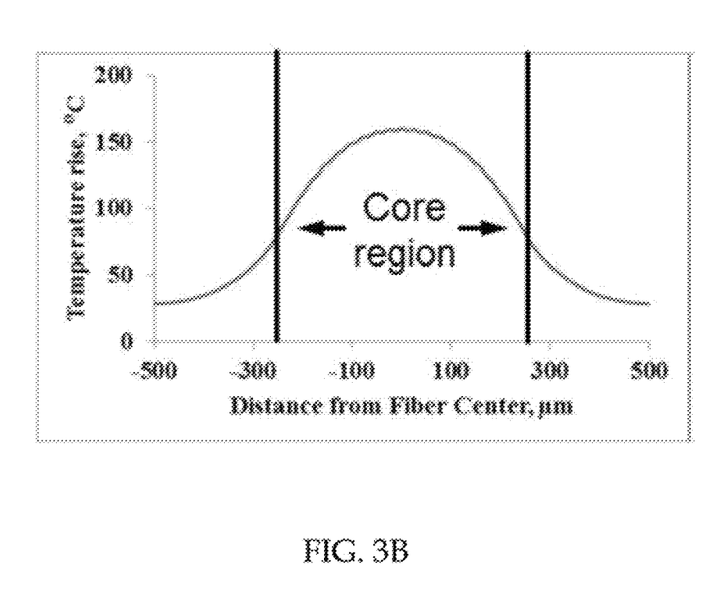
FIG. 3B is a graph of temperature as a function of distance from the center of the fiber of FIG. 3A.

The cross section of a ribbon fiber fabricated at Lawrence Livermore National Laboratory (LLNL) is shown in FIG. 1A. The ribbon fiber has a core 10 of Yb doped $SiO_2$, a first cladding 12 of $SiO_2$, an air cladding 14 and an outer jacket 16 also of $SiO_2$. FIG. 1B shows the cross section of a ribbon fiber with a pure silica ($SiO_2$) core 18 guided by air holes 20, also fabricated at LLNL. Ribbon fibers are single mode in the narrow dimension, but multimode in the wide dimension. The principle of operation in ribbon fibers relies on operating in a single high order mode and maintaining a substantially uniform temperature across the width of the large area core. LLNL has pioneered the concept, design, and demonstration of the first ribbon fiber lasers and amplifiers. The highest power achieved by LLNL to date in a single mode was 10 W. Simulations show that small temperature gradients at the wide edge of a ribbon fiber will cause a mixing of the ribbon fiber modes which would result in laser failure. FIG. 2 shows the progression of the laser intensity inside a ribbon fiber laser amplifier in the presence of mode mixing induced by a thermal gradient at the core edge. FIG. 3A is a cross-sectional thermal profile of a prior art 10 kW ribbon fiber amplifier. As in FIG. 1A, the core 30 comprises Yb—$SiO_2$ and the inner cladding 32 comprises pure silica ($SiO_2$). FIG. 3B is a graph of temperature as a function of distance from the center of the fiber of FIG. 3A.

Another fiber design with similar goals exists in the prior art, the 'semi-guiding high-aspect-ratio core' (SHARC) fiber [Marciante, Shkunov and Rockwell, Optics Express, v20, n18, 2012]. In this design, there is minimal guiding in the wide dimension in an effort to amplify only the fundamental mode with high purity. However, none of the previous efforts in ribbon fibers or high aspect ratio fibers has made an effort to mitigate mode mixing and distortion by creating a uniform thermal profile by the use of insulators or variable dopant concentration.

A purpose of ribbon fibers is to overcome the nonlinearities that are expected to limit the performance of circular core fibers at high average power [Dawson et al, Optics Express, v16, n17, p 13240, 2008]. To this end, it is critical to create a uniform thermal profile across the core that can be scaled to high power.

SUMMARY OF THE INVENTION

The present invention provides a method and apparatus that ensures a uniform temperature profile across the entire width of the core of a ribbon fiber laser or amplifier by the use of insulating core edges along with a spatially variable gain in the fiber core. These techniques for thermal management of high power optical fibers enables high average power ribbon fibers, which are a key to a variety of applications including practical laser cutting, laser welding, beam combining and thermal management of fiber Bragg gratings in a high-power fiber laser/amplifier.

Embodiments of the invention form a ribbon fiber that includes a core having a rare earth dopant and having a length and further having an aspect ratio that is orthogonal to the length. The long aspect of the aspect ratio is orthogonal to a relatively shorter aspect and the concentration of the rare earth dopant varies across the long aspect which spans from a first edge of the core to a second edge of the core. A variety of means for guiding light within the core are contemplated. For example, a lower index cladding can surround the core. One or more heat insulating elements are configured for flattening the thermal profile of the core. In one embodiment, the one or more heat insulating elements are configured for flattening the thermal profile of the core along the long aspect while light is guided within the core. The heat insulating element may be configured to reduce the amount of heat that can escape from at least one of edges. The heat insulating elements are usually not in direct contact one with the other.

The shorter aspect comprises a first side and a second side. At least one of the heat insulating elements may be configured to reduce the amount of heat that can escape from a portion of at least one of the first side and the second side. Note that it is desirable that the dopant concentration variation be as small as possible across a central region of the long aspect of the core. For example, such concentration can uniform within a 1% relative change across the central region of the long aspect and can decreases gradually or in steps on both sides of the central region in the directions toward the first edge and the second edge. The concentration may be less at the first edge and the second edge relative to a point half way between the first edge and the second edge. The concentration may be uniform across a central region of the long aspect and gradually decreases from the outer boundary of the central region in the direction of the first edge and the second edges. The concentration can have a profile that increases from the first edge and the second edge to a central region of the long aspect. It is desirable that the concentration has a profile selected to operate in conjunction with the one or more heat insulating elements to produce a temperature profile that is uniform, e.g., to within 2 deg. C. across the central area of the core in the long aspect when light is amplified in the core.

Note that each of the one or more heat insulating elements can comprise at least one air layer. Each air layer is usually operatively fixed relative to the its respective edge to reduce the amount of heat that can escape from that edge when light is amplified in the core. Note also that the means for guiding light within the core may include a first cladding in contact with and surrounding the core and that the first cladding has an effective index of refraction that is less than that of the core.

The invention also includes methods for using and for fabricating the apparatuses taught herein.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 3C:
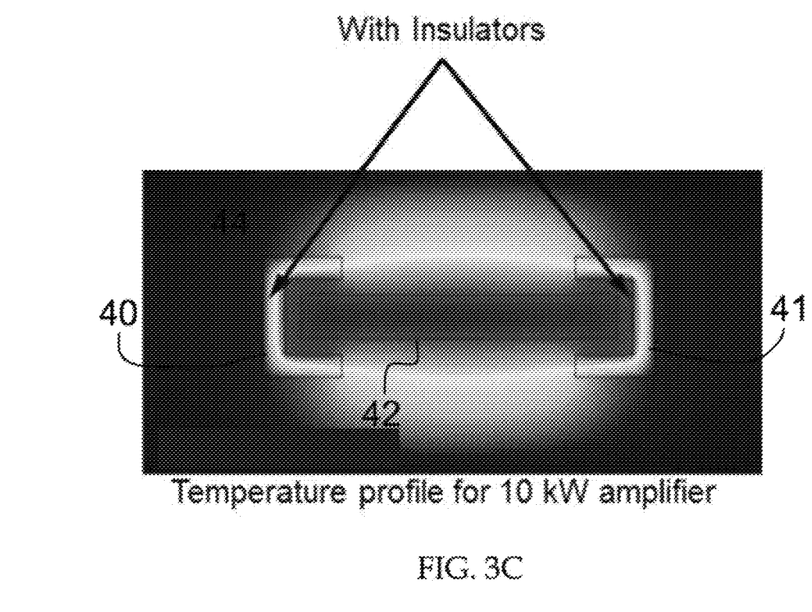
FIG. 3C is a cross-sectional thermal profile of a ribbon fiber 10 kW amplifier with insulators and with a spatially variable gain in the fiber core.
Figure 3D:
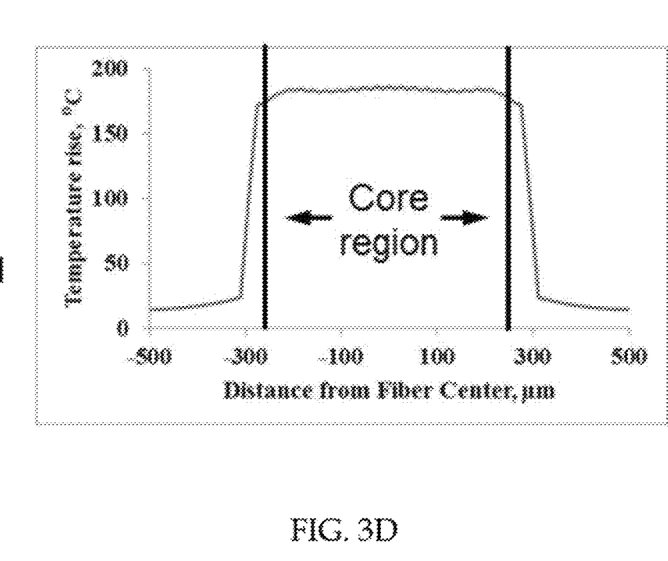
FIG. 3D is a graph of temperature as a function of distance from the center of the fiber of FIG. 3C.

The present invention provides a two-part solution for eliminating the thermal gradient at the edges of a ribbon fiber laser or amplifier. As mentioned above, a ribbon fiber has a high aspect ratio stretched core which allows the heat generated during lasing to be removed primarily in one dimension only, from the long faces of the core. One part of the solution is to insulate the edges of the ribbon core with an air gap. The insulation is placed at the edges of the narrow dimension, and slightly overlaps a portion of the wide dimension. This air gap causes the heat to exit only through the top and bottom of the ribbon core, but not through either of the edges. These insulating edges, however, cause the edges of the ribbon fiber to become slightly too hot. The excess heat is addressed with another part of the solution. The profile of heat generation in the fiber core is a result of the shape and concentration of the rare earth ion in the core. Because the edges become a little too hot with the insulating air gap, the ion concentration near the edge of the core is reduced in the present invention, which reduces the heat generation in this region. FIG. 3C is a cross-sectional thermal profile of a 10 kW ribbon fiber amplifier of the present invention and includes insulators 40 and 41 and with a spatially variable gain in the fiber core 42. As in FIG. 1A and FIG. 3A, the core 42 comprises a rare earth dopant such as Yb—$SiO_2$ and the inner cladding 44 comprises pure silica ($SiO_2$). FIG. 3D is a graph of temperature as a function of distance from the center of the fiber of FIG. 3C. By combining these two effects, the temperature profile across a ribbon core amplifier can be made to be nearly uniform as seen in FIG. 3D. This key contribution to ribbon fiber technology will enable high power demonstrations, and technology to be developed.

Figure 4:
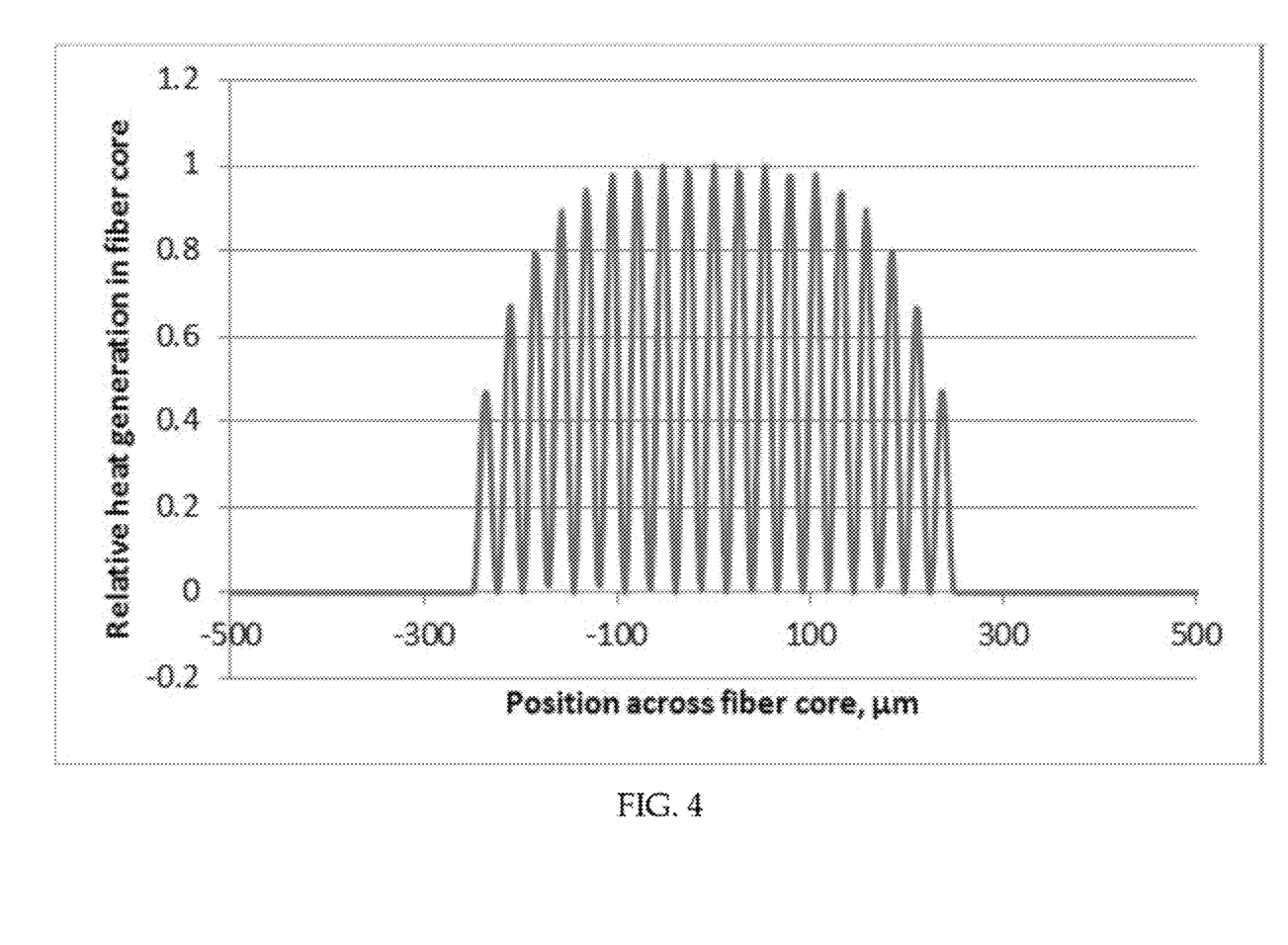
FIG. 4 shows the cross-sectional profile of the relative heat generation in a ribbon fiber amplifier in the presence of a spatially variable dopant concentration where there is a lower ion concentration at the edges, thereby causing lower heating.

FIG. 4 shows an example of the heat generation profile due to reduced doping concentration near the edges of a core. The heat is primarily generated at the lobes of the fiber mode when pump light is converted to laser light. The lobes near the center of the core have uniform heating while the lobes near the edge produce less heating due to a reduction in dopant ion concentration.

Specific designs for various embodiments of the present invention are achieved through an iterative optimization process. The ion concentration and insulators are optimized together to flatten the thermal profile. The process involves choosing an ion concentration profile than can be made (e.g., a super Gaussian-order 1), then adjusting the insulator arm lengths until the temperature gradient across the core is minimized. It is beneficial to laser efficiency if the doped regions fall under the high intensity lobes of the mode and not in between them, but note that heating is proportional to the optical intensity in the doped regions. For example, referring to FIG. 4, the doped canes are located under the mode lobes that produce the relative heat generation as shown as a function of position across the fiber core.

Referring to FIG. 3C, longer insulator arms 40 and 41 lead to greater heat collection at the edges. The goal is to balance the competing effects of both the increased heat retention from the insulators and the decreased heat deposition from the lowered ion concentration. Embodiments can be optimized on a case by case basis. Optimization can be accomplished using a finite element method (FEM) analysis tool such as Comsol for mode solving and thermal analysis.

An exemplary optimization procedure includes the following steps:

I. Choose a core geometry. In the exemplary embodiment discussed below, a 70×500 μm slab shape was chosen.

II. Calculate heat load per length of the amplifier based on the quantum defect, non-radiative transitions, and the amplifier length. 200 W/m was calculated for this example.

III. Find modes of the desired waveguide. In this case, a ribbon shaped core has slab waveguide modes like those of a wide stripe diode. Select the desired mode. A middle mode has less sensitivity to mode mixing than lower order modes and less bending loss than higher order modes. In this case, a 19-lobed mode was chosen.

IV. Calculate the heat generation distribution in W/m³. The heat will be deposited in proportion to the overlap of the relative optical intensity and the relative doping level in the core. The relative heat load result can be found by the following product: (heat load per unit length W/m) times (Normalized optical power profile of the mode (x,y)) times (doping profile in the glass (x)). Note: the resulting heat load integrated over the cross-section is normalized to the heat load per unit length (from item I.) by scaling the mode profile.

V. Using FEM based heat transfer models (e.g., Comsol), find the temperature rise profile associated with the heating profile from step IV. Without insulators, the profile will show a sharp drop in the temperature rise at the edges of the core. This drop will cause mod e mixing and failure.

VI. Add an insulating layer having a thickness of at least 15 μm to the model. The insulators should surround either end of the fiber and partially reach in toward the center of the core. The exact thickness and reach-length of the insulator layer is the subject/result of the optimization, and will be determined in later steps. One embodiment starts with a 15 μm thick layer, and a reach length of ⅓ of the distance to the center.

VII. Recalculate Step IV. With insulators only, the edges of the core become too hot relative to the center. This will cause mode mixing and failure.

VIII. Reduce the doping level near the edges of the core. In this case, a first order super gaussian shape was discretized into 6 levels and used as the profile.

IX. Parameter search/optimization: Adjust the thickness of the insulator, the central reach length and the shape of the dopant profile (recalculating step IV each time) until the temperature increase across the width of the core reaches a minimum. Less than 1-degree variation is desirable.

The insulators optimally form a U shape around each end of the ribbon core. The extent to which the insulators extend toward the center will depend on the exact design. The longer the insulators, the more heat is retained at the ribbon edges. Modeling the effect of the insulators along with the heating profile allows for specific designs to be found for a given power and size ribbon fiber amplifier.

Figure 5:
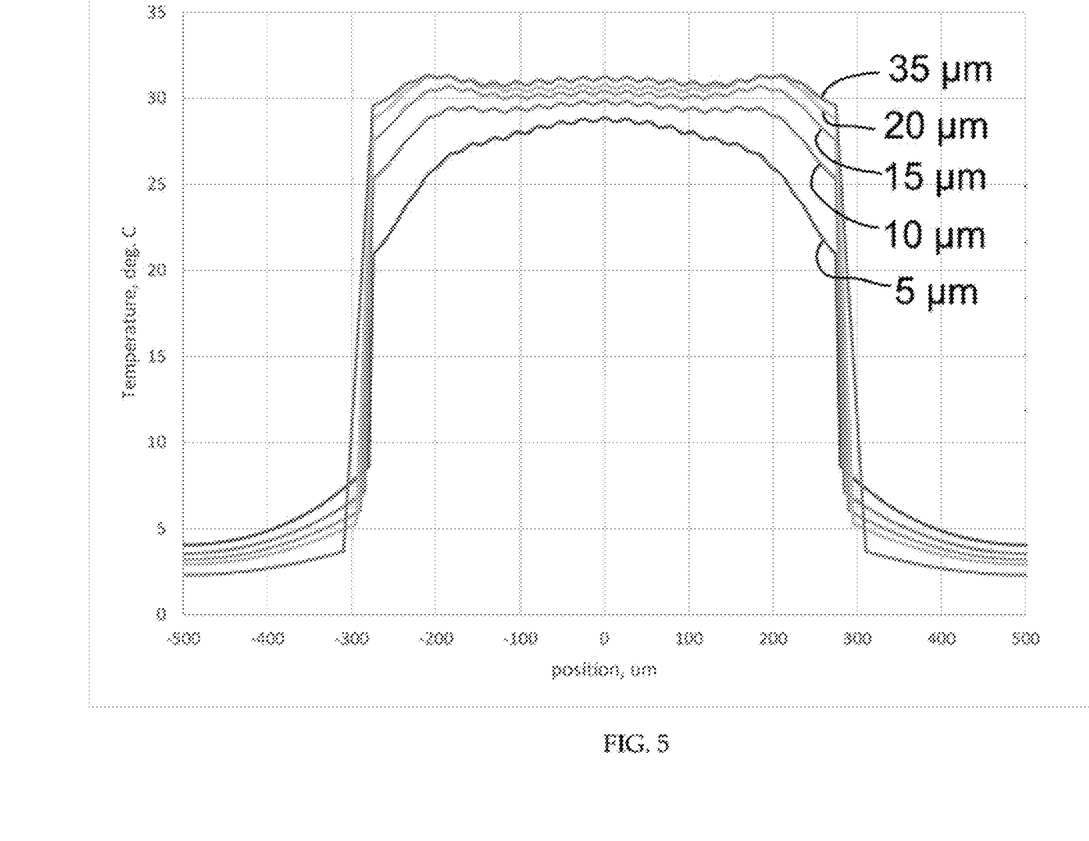
FIG. 5 shows the effect that occurs when the thickness of the insulating air layer is at least 15 μm thick and further shows that thinner air gaps will usually still allow significant heat flow through the insulator and the thermal profile will not flatten.

Fibers with non-circular symmetry are typically fabricated in a stack and draw process. In the example discussed below, the ribbon core is formed of a set of doped canes stacked side by side to form the ribbon core. In order to form the insulators, a set of capillaries are stacked to form the desired U shape on each end of the ribbon core. As typically done in a fiber draw, the interstitial spaces between solid canes and capillaries are evacuated by applying a vacuum, and positive pressure was applied to the capillaries causing them to slightly expand and generate an air gap which, once thick enough, formed the insulator portions. This air gap must be >15 μm thick in order to provide sufficient insulation. In this embodiment, the air gap was about 35 μm. As in this example, typically there are very thin glass webs formed from the capillary walls. Although the thermal conductivity will not be zero on these glass webs (<1 μm thick), the cross-sectional area is very thin and will not significantly impact the function of the insulating air regions. The plot of FIG. 5 shows the effect that occurs when the thickness of the insulating air layer is at least 15 μm thick and further shows that thinner air gaps will usually still allow significant heat flow through the insulator and the thermal profile will not flatten.

The variation in dopant concentration vs. location in the core can be estimated based on rate equation models of the laser performance. Two techniques for providing a varying dopant concentration are discussed. An option is to have glass made with the desired dopant concentration and use that glass. This method has proven to sometimes be unreliable. A second option, used in the present example, involves a homogenization process and has been more reliable. This technique combines glass rods of rare-earth dopant (such as Yb in this case) with glass rods of pure silica and/or Fluorine doped silica. Once stacked together, the combination is drawn several times into new canes. The combined refractive index and rare-earth dopant concentration of these homogenized canes can be set to a specific level. The present inventors have typically chosen the refractive index to be that of silica. However, the dopant concentration can be tailored by how many rare earth rods versus silica versus Fluorine doped rods are included in the stack. Thus, glass with many different levels of dopant concentration can be made.

The desired concentration per location can be assessed by first determining the peak concentration. This is determined by the maximum concentration that can be incorporated in silica without generation of photo-darkening or some other undesirable effect. From there, it is only the relative concentration to the peak that matters. It is the shape that is the driving factor in the thermal profile, not the absolute magnitude.

Figure 6:
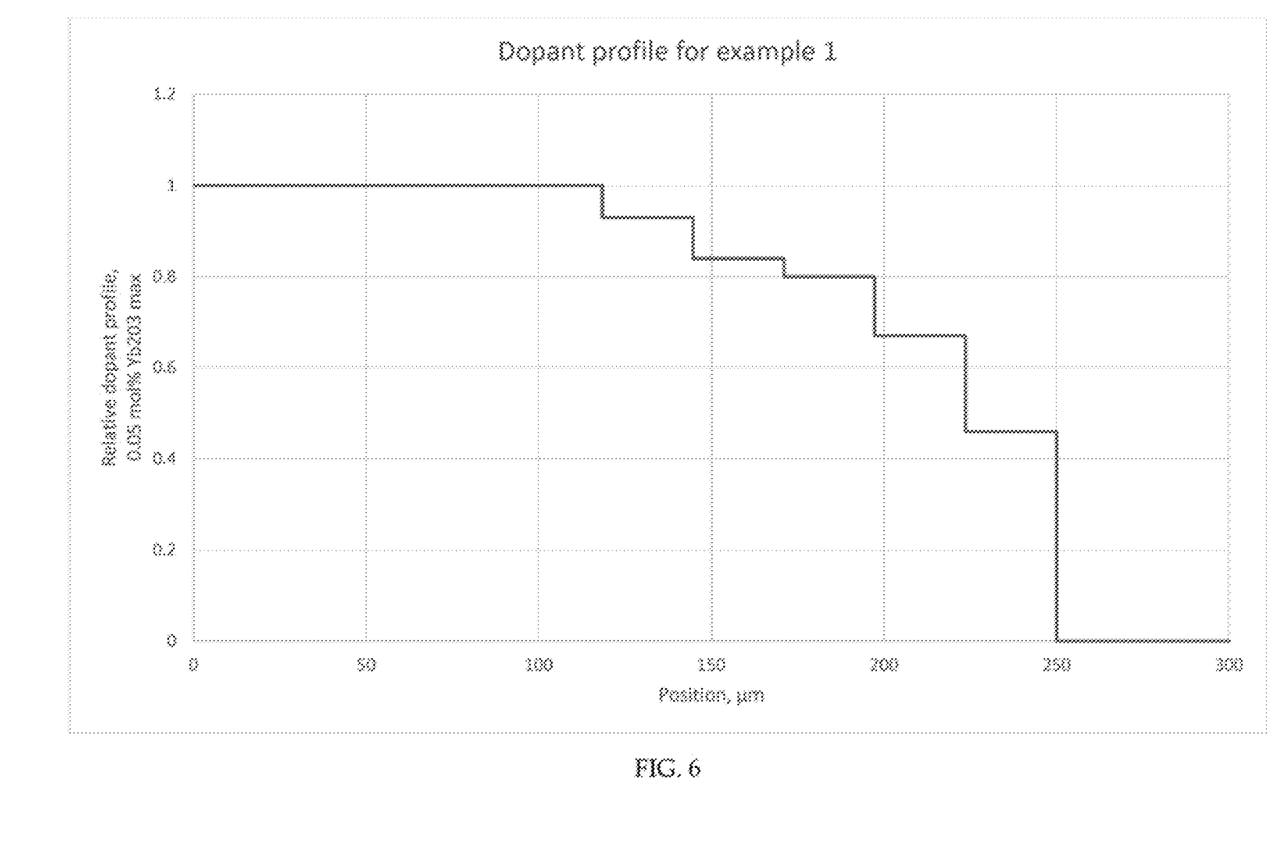
FIG. 6 shows the dopant profile for an exemplary embodiment.

The exemplary embodiment has the general configuration for the optical fiber shown in FIG. 3C for a ribbon Yb doped core region shown having the profile shown in FIG. 6. The core width was 500 μm and the core height was 70 μm. The insulator has a thickness of 35 cm, a height of 130 μm, a width of 125 μm and a gap of 225 μm. Heat deposition was assumed to be 200 W/m.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A ribbon fiber, comprising:
   only one core, wherein said core includes a rare earth dopant and has a length and an aspect ratio that is orthogonal to said length, wherein said aspect ratio comprises a long aspect that is orthogonal to a relatively shorter aspect, wherein the concentration of said rare earth dopant varies across said long aspect, wherein said long aspect spans a first edge of said core and a second edge of said core;
   means for guiding light within said core; and
   one or more heat insulating elements configured for flattening the thermal profile of said core along said long aspect.

2. The ribbon fiber of claim 1, wherein said one or more heat insulating elements are configured for flattening said thermal profile of said core along said long aspect while said light is guided within said core.

3. The ribbon fiber of claim 1, wherein said one or more heat insulating elements comprises at least a first heat insulating element or a second heat insulating element, wherein said first heat insulating element is configured to reduce the amount of heat that can escape from said first edge and wherein said second heat insulating element is configured to reduce the amount of heat that can escape from said second edge.

4. The ribbon fiber of claim 3, wherein said first heat insulating element is not in direct contact with said second heat insulating element.

5. The ribbon fiber of claim 3, wherein said shorter aspect comprises a first side and a second side, wherein said first heat insulating element is configured to reduce the amount of heat that can escape from a portion of at least one of said first side and said second side.

6. The ribbon fiber of claim 3, wherein said shorter aspect comprises a first side and a second side, wherein said second heat insulating element is configured to reduce the amount of heat that can escape from a portion of at least one of said first side and said second side.

7. The ribbon fiber of claim 3, wherein said shorter aspect comprises a first side and a second side, wherein said first heat insulating element is configured to reduce the amount of heat that can escape from a portion of at least one of said first side and said second side, wherein said second heat insulating element is configured to reduce the amount of heat that can escape from a portion of at least one of said first side and said second side.

8. The ribbon fiber of claim 1, wherein said concentration is uniform within a 1% relative change across a central region of said long aspect and decreases gradually on both sides of said central region in the directions toward said first edge and said second edge.

9. The ribbon fiber of claim 1, wherein said concentration is uniform within a 1% relative change across a central region of said long aspect and decreases in steps on both sides of said central region in the directions toward said first edge and said second edge.

10. The ribbon fiber of claim 1, wherein said concentration is less at said first edge and said second edge relative to a point half way between said first edge and said second edge.

11. The ribbon fiber of claim 1, wherein said concentration is uniform across a central region of said long aspect and gradually decreases from the outer boundary of said central region in the direction of said first edge and said second edge.

12. The ribbon fiber of claim 1, wherein said concentration has a profile that increases from said first edge and said second edge to a central region of said long aspect.

13. The ribbon fiber of claim 1, wherein said concentration has a profile selected to operate in conjunction with said one or more heat insulating elements to produce a temperature profile that is uniform within 2 deg. C. across a central area of said core in said long aspect when light is amplified in said core.

14. The ribbon fiber of claim 1, wherein said one or more heat insulating elements comprises at least one air layer.

15. The ribbon fiber of claim 1, wherein said one or more heat insulating elements comprises a first air layer and a second air layer, wherein said first air layer is operatively fixed relative to said first edge to reduce the amount of heat that can escape from said first edge when light is amplified in said core, wherein said second air layer is operatively fixed relative to said second edge to reduce the amount of heat that can escape from said second edge when light is amplified in said core.

16. The ribbon fiber of claim 1, wherein said means for guiding light within said core includes a first cladding in contact with and surrounding said core, wherein said first cladding has an effective index of refraction that is less than, that of said core.

17. The ribbon fiber of claim 16, wherein said one or more heat insulating elements comprises at, least one of a first air layer and a second air layer, wherein said first air layer is in contact with said first cladding and is Operatively fixed relative to said first edge to reduce the amount of heat that can escape from said first edge when light is amplified in said core, wherein said second air layer is in contact with said first cladding and is operatively fixed relative to said second edge to reduce the amount of heat that can escape from said second edge when light is amplified in said core.

18. An apparatus, comprising:
a only one core, wherein said core includes a rare earth dopant and has a cross-sectional area that is orthogonal to the length of said core, wherein the concentration of said rare earth dopant varies across a dimension of said cross sectional area;
means for guiding light within said core; and
one or more heat insulating elements configured for flattening the thermal profile of said core across said dimension.

19. A ribbon fiber, comprising:
only one core, wherein said core comprises a spatially varying rare earth dopant concentration across a long dimension of the cross-sectional area of said length;
a cladding surrounding said core and configured for guiding light within said core; and
at least one air layer configured for flattening the thermal profile of said core across said long dimension.

20. The ribbon fiber of claim 19, wherein said concentration is uniform within a 1% relative change across a central, portion of said long dimension.

21. A method for fabricating a ribbon fiber, comprising:
forming only one core, wherein said core has a rare earth dopant and a length and further includes an aspect ratio that is orthogonal to said length, wherein said aspect ratio comprises a long aspect that is orthogonal to a relatively shorter aspect, wherein the concentration of said rare earth dopant varies across said long aspect, wherein said tog aspect spans a first edge of said core and a second edge of said core;
operatively contacting to said core a means for guiding light within said core; and
operatively contacting to said means for guiding light one or more heat insulating elements configured for flattening the thermal profile of said core along said long aspect, wherein said ribbon fiber does not include another core.

22. The method of claim 21, configuring said one or more heat insulating elements for flattening said thermal profile of said core along said long aspect while said light is guided within said core.

23. The method of claim 21, wherein said one or more heat insulating elements comprises at least a first heat insulating element or a second heat insulating element, wherein said first heat insulating element is configured to reduce the amount of heat that can escape from said first edge and wherein said second heat insulating element is configured to reduce the amount of heat that can escape from said second edge.

24. The method of claim 23, wherein, said first heat insulating element is not in direct contact with said second heat insulating element.

25. The method of claim 23, wherein said shorter aspect comprises a first side and a second side, wherein said first heat insulating element is configured to reduce the amount of heat that can escape from a portion of at least one of said first side and said second side, wherein said second heat insulating element is configured to reduce the amount of heat that can escape from a portion of at least one of said first side and said second side.

26. The method of claim 21, wherein said concentration is uniform within a 1% relative change across a central region of said long aspect and decreases gradually or in steps on both sides of said central region in the directions toward said first edge and said second edge.

27. The method of claim 21, wherein said one or more heat insulating elements comprises at least one air layer.

28. The method of claim 21, wherein said means for guiding light within said core includes a first cladding in contact with and surrounding said core, wherein said first cladding has an effective index of refraction that is less than that of said core.

29. A method, comprising:
forming only one core, wherein said core includes a rare earth dopant and has a cross sectional area that is orthogonal to the length of said core, wherein the concentration of said rare earth dopant varies across a dimension of said cross sectional area;
operatively connecting to said core a means for guiding light within said core; and
operatively connecting to said means for guiding light one or more heat insulating elements configured for flattening the thermal profile of said core, across said dimension.

30. A method, comprising:
providing a ribbon fiber including:
only one core, wherein said core includes a rare earth dopant and has a length and an aspect ratio that is orthogonal to said length, wherein said aspect ratio comprises a long aspect that is orthogonal to a relatively shorter aspect, wherein the concentration of said rare earth dopant varies across said long aspect, wherein said long aspect spans a first edge of said core and a second edge of said core;
means for guiding light within said core; and
one or more heat insulating elements configured for flattening the thermal profile of said core; and
directing light into said core.

* * * * *